73-181.
2-4-75 OR SR RE28327

Feb. 4, 1975 J. R. LEWIS Re. 28,327

FARADAY EFFECT SPEEDOMETER

Original Filed Feb. 3, 1972

3 Sheets-Sheet 1

FARADAY EFFECT SPEEDOMETER

Original Filed Feb. 3, 1972 3 Sheets-Sheet 2

FARADAY EFFECT SPEEDOMETER

Original Filed Feb. 3, 1972 3 Sheets-Sheet 3

United States Patent Office

Re. 28,327
Reissued Feb. 4, 1975

28,327

FARADAY EFFECT SPEEDOMETER

John R. Lewis, Framingham, Mass., by Safe Flight Instrument Corp., White Plains, N.Y., assignee.

Original No. 3,777,561, dated Dec. 11, 1973, Ser. No. 223,119, Feb. 3, 1972. Application for reissue Apr. 10, 1974, Ser. No. 459,543
(Filed under Rule 47(b) and 35 U.S.C. 118)
Int. Cl. G01p 5/08
U.S. Cl. 73—181 22 Claims

Matter enclosed in heavy brackets [ ] appears in the original patent but forms no part of this reissue specification; matter printed in italics indicates the additions made by reissue.

ABSTRACT OF THE DISCLOSURE

A speedometer employing the Faraday Effect principle which includes a magnet having two sets of alternating north and south poles disposed in a housing and adapted for rotation therein to provide an alternating magnetic field. The housing is disposed adjacent the wall of a vessel such that the magnetic field extends through the vessel wall and into the fluid on the other side of the vessel wall. Electrodes are disposed in the wall of the vessel and in the mangetic field. A sense coil is disposed external to the housing and sealed from the fluid such that the sense coil is responsive to the alternating magnetic field and provides a switching waveform. The flow of fluid across the outer wall of the vessel on its movement changes the potential across the electrodes and a corresponding signal is provided. The signals from the sense coil and the electrodes are combined to yield a signal corresponding to the speed of the vessel.

BACKGROUND OF THE INVENTION

Several different methods are used to measure fluid velocity. Two obvious examples, of course, are the venturi and the Pitot tube. Also, when measuring fluid flow, such as of a liquid, paddle wheels have been used wherein the rate of rotation of the wheel depends upon fluid velocity; and the vortex tear principle has been employed wherein a rod-shaped perturbation is inserted into the flow. The rate at which the vortex swirls form and tear off depend upon the velocity. These devices are not entirely satisfactory in that where there are parts projecting into the fluid flow, this causes drag and perturbs the flow being measured. Further, such projecting parts are liable to be broken off or damaged. In the case of the venturi and Pitot tubes, they have narrow orifices which may foul.

To overcome the problems of the above devices, an instrument embodying the Faraday Effect would avoid these problems in a fundamental way. Where employing the Faraday Effect for measuring fluid velocity, a magnetic field may be placed in the vicinity of the fluid flow. Two electrodes making conductive contact with the fluid in the vicinity of the magnetic field may be disposed in communication with an amplifier to measure the potential between the electrodes. The fluid passing through the electric field causes a potential proportional to the appropriate velocity component which may be observed across the electrodes. However, in this simplest embodiment, it is difficult to secure reliable measurements corresponding to the fluid velocity due to several factors, one of which is the existence of an unstable galvanic potential generated by the fluid electrode contact. Further, the electrode configuration is sensitive to other electric fields present, such as 60 Hz power. One way to overcome the problems of a device measuring fluid velocity employing the Faraday Effect would be to use nonpolarizable electrodes, such as are used in pH meters. However, these electrodes are relatively expensive and require considerable attention. Therefore, there exists a need for a fluid velocity device which would eliminate the disadvantages of the prior art devices and employ the Faraday Effect to secure a reliable indication of velocity.

SUMMARY OF THE INVENTION

My invention is directed to a device and method for measuring fluid velocity. In particular, my invention concerns a Faraday Effect speedometer to determine the relative motion between the hull of a vessel and the water. The device and method of my invention employ the Faraday Effect principle and preferably in one embodiment shift the Faraday Effect potential from centered around direct current to a potential centered around modulation frequency; and more particularly, to the modulation of the mangetic field.

In one embodiment a mangetic source having a magnetic field is provided and modulation accomplished by alternating the polarity of the magnetic field with the resultant continual reversal of the magnetic field. The invention comprises a permanent magnetic source having at least a north and a south pole and preferably a plurality of north and south poles, such as two north and two south poles. The magnet is rotated at a predetermined speed to provide a dominant mangetic field component with a predetermined frequency. The magnetic field source is disposed such that the fluid flow to be measured passes through the magnetic field. Also disposed in the magnetic field are two electrodes. Further, a device is disposed in the magnetic field to provide a signal corresponding to the angular position of the magnet. The signals from the device and the electrodes are fed to a circuit to provide a signal corresponding to the fluid velocity.

In the preferred embodiment a rotating magnet having alternating north and south poles is disposed in a housing to seal the rotating magnet from the fluid being measured and shield the electrodes from electric fields due to the motor. Electrodes are disposed external of the housing and within the magnetic field and the fluid flow path. A switch mechanism, such as a sensing coil, is fixed external of the housing and in the magnetic field and preferably not in the fluid flow path. The sense coil is responsive to the alternating magnetic field and provides a switching signal. A circuit receives the signals from the sense coil and the electrodes and provides a meter readout. The fluid velocity measured with my invention includes any fluid, gas or liquid, having sufficient electrical conductivity to enable potential measurement; and if the liquid or gas, particularly gas, does not in and of itself have enough electrical conductivity to enable potential measurement, it may be ionized or radiated to provide the same.

My invention includes a device for measuring fluid velocity which comprises: means to provide an alternating magnetic field; means in the alternating magnetic field to measure the change in potential caused by a fluid flowing through said magnetic field; means to provide a switching waveform corresponding to the alternating magnetic field; and means to combine the alternating waveform and the signal to yield a value corresponding to the fluid velocity being measured.

The method of my invention includes: providing an alternating magnetic field; flowing a fluid through said magnetic field; measuring the potential generated by the flow of said fluid through the magnetic field; providing an alternating waveform corresponding to the alternating magnetic field; and combining the alternating waveform and the signal generated by the measured potential of the fluid flowing through the magnetic field to provide a signal corresponding to said fluid velocity.

BRIEF DESCRIPTION OF THE PREFERRED EMBODIMENT

Figure 1:
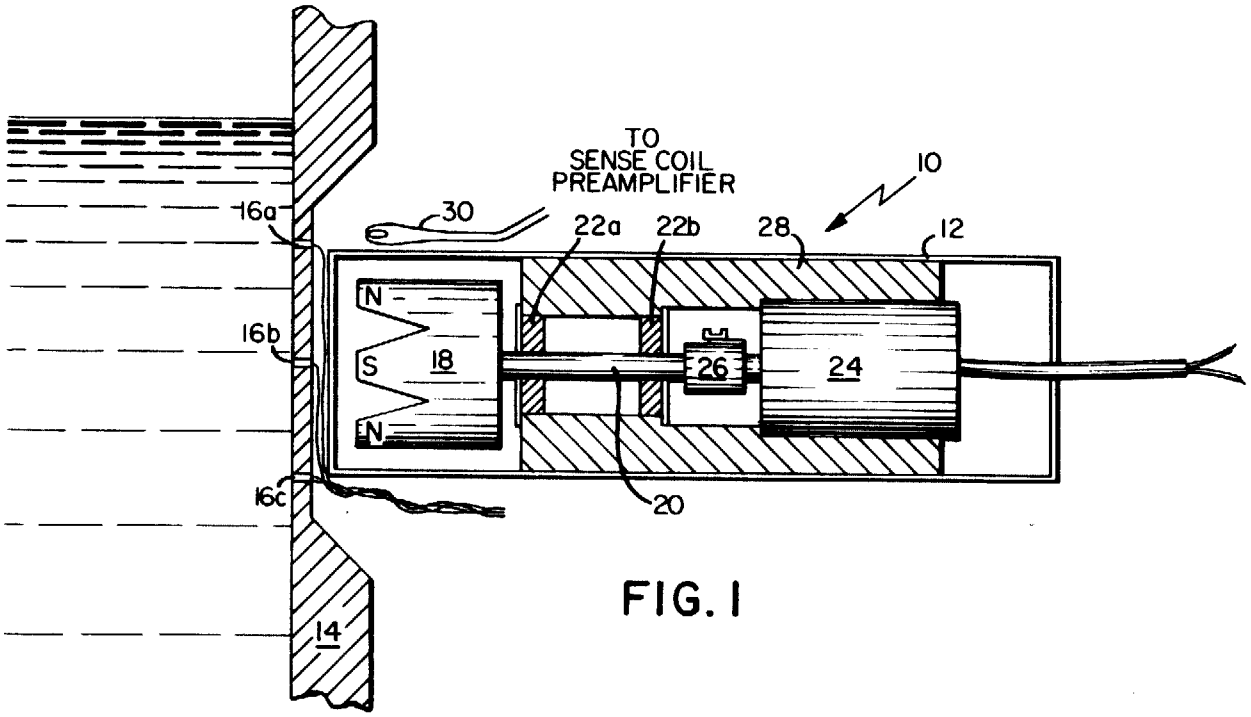
FIG. 1 is a sectional illustration of my invention disposed in the hull of a vessel.

Referring to FIG. 1, the device is shown generally at 10 and includes a housing 12, one end of the housing received in depression in a vessel wall 14. Electrodes 16a, b, and c, such as copper electrodes or any other suitably stable metal, are passed through the vessel wall 14 in a fluid-tight manner. The electrodes 16a, b, and c are generally small in area compared to the magnetic pole face area. The electrodes 16b is connected to the face of the housing and to a ground of a differential amplifier. The electrodes 16a and c are connected to the + and − inputs of the differential amplifier. A side pole magnet 18 having two sets of north and south poles in alternating relationship is disposed within the housing and positioned such that the magnetic field passes through the face of the housing 12 to the wall of the vessel 14 and sufficiently beyond the wall of the vessel such that the conductive fluid flowing outside the vessel will pass through the magnetic field. The magnet is secured to a shaft 20 which in turn is secured to motor 24 through coupling 26. The shaft 20 is supported by bearing blocks 22a and b. The bearing blocks and motor are disposed in frame 28 within the housing 12 to stabilize the magnet shaft motor assembly. A sense coil 30 is fixed within the vessel wall 14 and external of the housing 12 and within the magnetic field.

Figure 2:
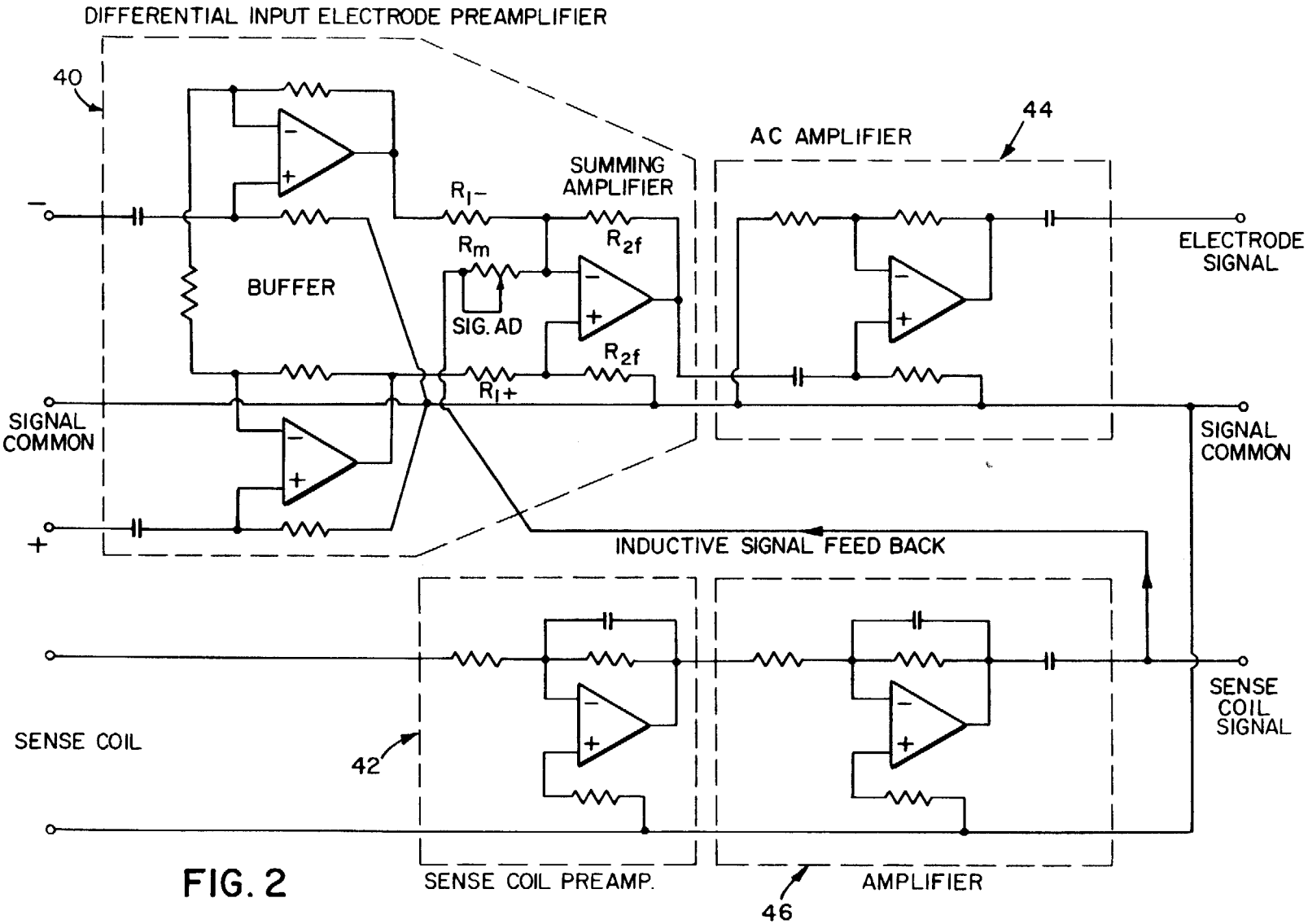
FIG. 2 is a schematic diagram of the differential amplifier of my invention.
Figure 3:
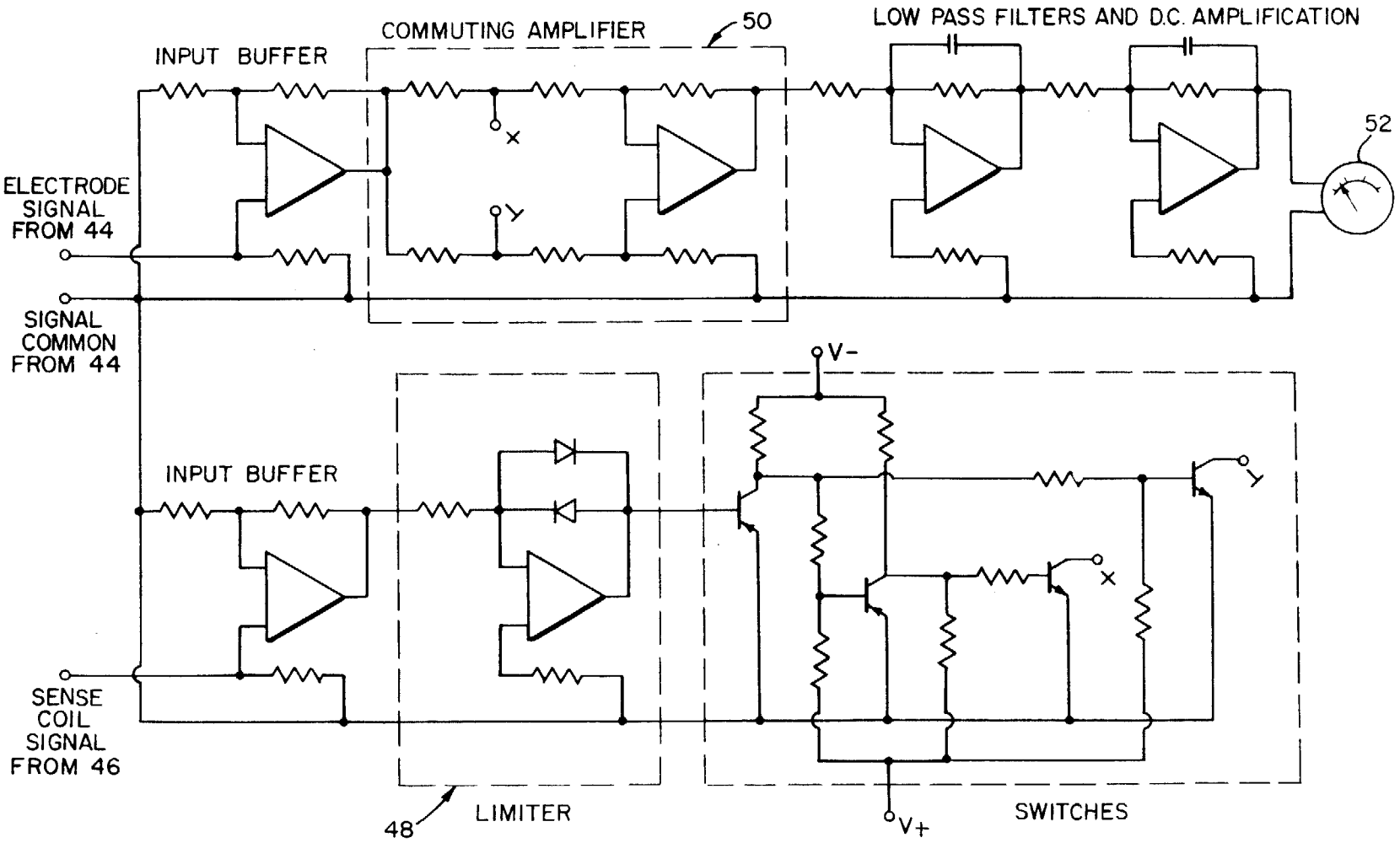
FIG. 3 is a schematic diagram of the commuting amplifier of my invention.

Referring to FIG. 2, the leads from the electrodes 16a and c are connected to the positive and negative inputs of the differential amplifier 40. The signal from the sense coil 30 passes to preamplifier 42 and amplifier 46. Part of this signal is fed back through $R_m$ to the summing stage of the differential amplifier 40 where it is summed with the electrode signal. The signal is also passed to limiter 48 shown in FIG. 3 to effect a change in signal as indicated and then to commuting amplifier 50. The signal from the differential amplifier 40 (which is now an amplified version of the electrode signal plus a controlled fraction of the sense coil signal) passes through amplifier 44 then to the commuting amplifier 50.

In the operation of the invention the magnet 18 is rotated at approximately 1,400 RPM at which level of rotation the sense coil would reflect a value of approximately 3 millivolts. The response of the sense coil is proportional to the RPM's of the motor such that if the RPM's were 2,800, the response of the sense coil would be 6 millivolts. The fluid such as water in the alternating magnetic field region generated by rotating magnet 18 which field is external of the vessel wall 14 is held static, i.e., no relative motion between the vessel and the water, and a signal, such as in a range of from 20 microvolts to 100 microvolts, is received by the differential amplifier 40. This signal is due to the inductance of the electrodes. The signal from the electrodes under static conditions then passes to the summing stage of the differential amplifier 40, where it is summed with an adjustable fraction of the amplified sense coil signal. This fraction is adjusted so that the average of the sum as indicated by the readout is zero. In other words, since the circuit is linear, the output is in the form of AV + BW with A and B constants of proportionality, V is fluid flow and W is motor angular frequency. To cancel effects due to varying motor speed, any voltage of proper frequency and phase and proportional to W may be added in to the summing stage of the differential amplifier. The output is then AV + BW + B′W, and B′ is adjusted to be equal to −B yielding an output independent of the motor speed. Of course, V is also 0 under static conditions. Thus the by-pass of the voltage from the sense coil to the summing stage of the differential amplifier under static conditions allows the instrument to be "zeroed in" whereby under nonstatic conditions the output reflected in the meter 52 is independent of the motor speed.

Figure 4:
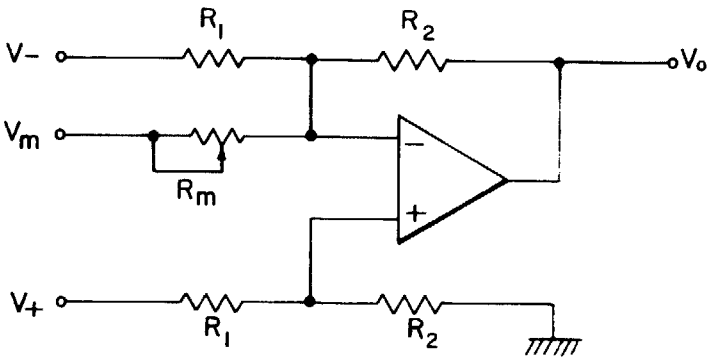
FIG. 4 is a schematic diagram of the summing amplifier.

Referring to FIG. 4, the summing amplifier 41 is shown in greater detail. By elementary feedback analysis, assuming an ideal operational amplifier, we find:

$$V_o = -\frac{R_2}{R_m}V_m - \frac{R_2}{R_1}V_- + \frac{R_2}{R_1+R_2}\left[1+\frac{R_2}{R_1 \| R_m}\right]V_+$$

Now if we call $R_2/R_1 \equiv G$, the signal gain $R_2/R_m = G_m$, the inductive signal gain And we assume that $G >> G_m$, we find that $$V_o = G\,(V_+ - V_-) - G_m V_m$$

That is, the output of the summing amplifier can be expressed as a fixed (to this approximation) multiple of the differential input voltage plus an adjustable coefficient ($-G_m$) times the feedback inductive signal ($G_m = R_2/R_m$, adjust $G_m$ by varying $R_m$).

When there is relative motion between the water and the vessel, and the motor is rotating at a predetermined rate, such as 1,400 RPM, then as described above the signal generated by the sense coil will be approximately 3 millivolts. The motor driven at this speed is such that the dominant magnetic field component has a frequency of about 47 Hz. The sense coil 30 of about 50 turns in 1 cm.² area as shown in FIG. 1 is located near the magnet but external of the housing and is in fixed position relative to the magnet. The sense coil 30 picks up a quiet voltage which changes sign as the magnet rotates through 90°. With relative motion now effected between the vessel and the water, the electrodes which are in contact with the water measure the change in potential. The voltage thus presented to the differential amplifier 40 is the sum of several components; namely, galvanic potenial due to fluid electrode contact, the component due to time varying magnetic field in the vicinity of the electrode leads (inductive effect), components due to time varying magnetic field in fluid (inductive effect), Faraday Effect component, random noise due to thermal noise and flow turbulence, and ambient field pick-up such as 60 Hz or ignition noise.

The galvanic potential is an unstable DC voltage and exhibits drift over time and jumps or ramps when equilibrium conditions at the electrodes are suddenly disturbed. It is a high level, low frequency signal. The random noise is usually low level but wide band. The ambient field pickup can be high level, but is usually concentrated at distinct frequencies. These components are greatly attenuated by the circuit as shown in FIG. 2 which is sensitive to only a narrow band around the dominant frequency.

The inductive and Faraday Effects are inseparable in frequency since they are both caused by the same rotating permanent magnet. However, as previously described, when the device is calibrated or "zeroing in," the effects of the undersired inductive signal are eliminated.

In FIG. 2, the circuitry employed in the preferred embodiment is designed to achieve stable gain characteristics. The differential amplifier 40 has high impedance from either + or − input to ground so that the conductivity of the fluid does not affect the voltage measured. This differential voltage is AC amplified so that the DC voltage from the galvanic potential is attenuated. The voltage from the sense coil 30 is also AC amplified and then limited at 48 so that the sense signal at S is a switching waveform that changes sign as the four-pole magnet rotates 90°. This switching waveform switches the sign of the gain of the commuting amplifier from $+k_c$ to $-k_c$ as the switching waveform changes sign. Thus, the voltages from the differential amplifier 40 pass through the commuting amplifier 50 and the resultant waveform is passed through a low-pass filter DC amplifier stage and presented to the meter. This switching and subsequent averaging of the circuits has the effect that only voltages at the input which change sign as the magnet rotates 90° will give nonzero averages hence giving readings on the meter. Therefore, the output is only sensitive to signals within a narrow band of the dominant frequency and of appropriate phase. This frequency selectiveness reduces the effect of galvanic potential centered around zero frequency, random noise due to the narrow band width, and ambient fields whereby using 47 Hz as the dominant frequency 60 Hz is greatly attenuated.

Referring specifically to the preferred embodiment with a vessel moving at a rate of 12 knots, the signal due to the Faraday Effect might be 480 microvolts, zero to peak, at the electrodes, 3 volts, zero to peak, at the commuting amplifier input and 6 volts DC at the output of the low-pass filter—DC amplifier whereby a reading of 12 knots (fluid velocity) would be reflected on the meter 52.

Although described in the preferred embodiment with a four-pole rotating magnet, it is obvious that a two-pole rotating magnet may be used or a multi-pole magnet having a plurality of poles such as in the bucking relationship. Further an electromagnetic source may also be used provided with an alternating reversing field in lieu of the permanent magnet. In lieu of the sensing coil, any mechanism, such as a pair of reed switches responsive to the changing polarity, may be used as long as a switching waveform is provided. Further, if the geometry of the electrodes, their leads, and the magnet is such that the inductive pickup is not a large proportion of the error which may be induced, the by-pass of the signal to the summing amplifier may be eliminated.

My invention may be used to measure any relative motion whether the fluid or the device or both are moving. Further, the fluid may be unconfined, as in the preferred embodiment, or confined such as flowing through ducts, pipes, conduits, etc.

Having described the invention, what is now claimed is:

1. A speedometer device adapted to measure the relative motion between a vessel and the water in which the vessel is disposed, which device comprises in combination:

a. a permanent magnet having at least one set of alternating north and south poles at one end thereof;

b. means to rotate the permanent magnet about its axis, and to provide an alternating magnetic field, the axis of the magnet adapted to be disposed generally perpendicular to the wall of the vessel whose motion relationship to the water is to be determined, the one end of the magnet in such a relationship to the wall of the vessel so that the alternating magnetic fields extend beyond the wall of the vessel and into the water in which the vessel is disposed;

c. means disposed in the alternating magnetic field and in contact with the water to measure the change in potential caused by motion of the vessel through the water, and to provide an alternating signal corresponding to the change in potential by such motion;

d. sensing means disposed in and responsive to the alternating magnetic field to provide a sensing signal; and e. means to combine the alternating signal and the sensing signal to yield a signal value corresponding to the rate of movement of the vessel through the water.

2. The device of claim 1 which includes a vessel having a hull in contact with the water in which it is disposed for movement, the hull characterized by a depression therein, the one end of the device of claim 1 disposed within the depression and substantially perpendicular and in close relationship with the hull wall of the vessel of the depression.

3. The device of claim 1 wherein the permanent magnet has a plurality of alternating north and south poles at the one end thereof.

4. The device of claim 1 wherein the permanent magnet has two sets of alternating north and south poles at the one end thereof.

5. The device of claim 1 wherein the sensing means to provide a sensing signal responsive to the alternating magnetic field includes a sensing coil.

6. The device of claim 1 wherein the means to measure the change in potential includes at least two electrodes disposed in contacting engagement with the water in which the vessel is disposed for movement.

7. The device of claim 1 wherein the means to combine the alternating signal and the sensing signal correponding to the change in potential includes a summing amplifier.

8. The device of claim 8 wherein the means to combine the alternating signal and the sensing signal corresponding to the change in potential includes a differential amplifier in combination with a summing amplifier.

9. The device of claim 1 which includes means to display the signal value corresponding to the speed of the vessel in the water.

10. The device of claim 1 wherein the permanent magnet and the means to provide an alternating magnetic field are disposed within a housing and the alternating magnetic field extends beyond said housing into the water in which the vessel is disposed for movement, the means to measure the change in potential is in contacting engagement with the water and the means to provide a sensing signal is disposed externally of the housing and sealed from the water.

11. The device of claim 1 which includes means to adjust the value of the sensing signal whereby the adjusted signal and the alternating signal corresponding to the change in potential may be combined to yield a signal value corresponding to a static speed of the vessel and water.

12. The device of claim 1 which includes limiter means to convert the sensing signal to a switching signal.

13. A Faraday Effect speedometer device adapted to measure the rate of movement between the hull of a vessel and the water, which device comprises in combination:

a. a vessel having a wall in contact with the water in which the vessel is disposed for movement, the wall characterized by a depression therein;

b. a housing;

c. a permanent magnet having at least one set of alternating north and south poles at one end thereof;

d. means to rotate the permanent magnet about its axis and to provide an alternating magnetic field, the means to rotate and the permanent magnet disposed within the housing, the one end of the magnet disposed in a close relationship to one end of the wall of the housing, the one end of the magnet positioned within the depression in the hull of the vessel with the axis of the magnet disposed in a generally perpendicular position to the vessel wall of the depression, the one end of the magnet placed in such a relationship to the vessel wall of the depression, so that the alternating magnetic field extends beyond the depression wall of the vessel into the water in which the vessel is disposed for movement;

e. a plurality of electrodes disposed in a fluid-tight manner in the wall of the vessel, the electrodes passing through the wall and placed in contact with the water in which the vessel is disposed on the opposite side of the vessel wall, and in alternating magnetic field;

f. a sensing coil disposed in the alternating magnetic field positioned externally of the housing, and sealed from contacting engagement with the water, the sensing coil providing a sensing signal responsive to the alternating magnetic field;

g. a circuit means including an amplifier to combine the sensing signal and the alternating signal corresponding to the change in potential caused by the movement of the vessel through the water to yield a signal value corresponding to the speed of the vessel in the water; and h. means to display the signal value in knots per hour.

14. A method of determining the speed of a vessel, which method comprises:

a. positioning one end of a permanent magnet having at least one set of alternating north and south poles at the one end thereof in a close spatial relationship with the interior wall of the vessel whose speed is to be determined, the external wall of the vessel disposed in the water;

b. rotating the permanent magnet about its axis to provide an alternating magnetic field which extends through the wall of the vessel and into the water in which the vessel is disposed, the axis of the magnet positioned substantially perpendicular to the interior wall of the vessel;

c. determining a sensing signal due to the alternating magnetic field when no relative motion occurs be tween the wall of the vessel and the water;

d. measuring an alternating signal due to the change in potential of the alternating magnetic field on movement of the vessel through the water; and e. combining the sensing signal and the alternating signal to provide a signal value corresponding to the speed of the vessel through the water.

15. The method of claim 15 which includes displaying the signal value.

16. The method of claim 14 which includes providing a depression in the wall of the vessel, and positioning the one end of the magnet in the depression for rotation in close spatial relationship with the wall of the depression adjacent the water in which the vessel is disposed.

17. The method of claim 14 which includes summing the various potentials arising from the alternating magnetic field when no relative motion occurs between the vessel and the water in a differential amplifier to obtain a signal value independent of the speed of rotation of the magnet.

18. The method of claim 14 which includes converting the alternating waveform of the sensing signal to a switching signal, and combining the switching signal and the alternating signal.

19. The method of claim 14 wherein the sensing signal and the alternating signal are combined in a summing amplifier.

*20. A Faraday effect device adapted to measure the relative motion between it and an electrically conductive fluid, which device comprises in combination:*

*(a) a permanent magnet having at least one set of alternating north and south poles at one end thereof;*

*(b) means to rotate the permanent magnet about an axis generally perpendicular to the direction of relative motion of the device and fluid to provide an alternating magnetic field extending into the fluid;*

*(c) means disposed in the alternating magnetic field and in contact with the fluid to measure the change in potential caused by the relative motion of the device and fluid, and to provide an alternating signal corresponding to the change in potential by such motion;*

*(d) sensing means disposed in and responsive to the alternating magnetic field to provide a sensing signal; and*

*(e) means to combine the alternating signal and the sensing signal to yield a signal value corresponding to the relative motion of the device and fluid.*

*21. A Faraday effect device adapted to measure the rate of movement between a wall and a fluid, which device comprises in combination:*

*(a) a wall having one side in contact with the fluid;*

*(b) a permanent magnet having at least one set of alternating north and south poles at one end thereof on the other side of said wall;*

*(c) means on said other side of said wall to rotate the permanent magnet about an axis and to provide an alternating magnetic field, the one end of the magnet being disposed in a close relationship to said wall with said axis of the magnet disposed in a generally perpendicular position to said wall, the one end of said magnet being placed in such a relationship to the wall, so that the alternating magnetic field extends beyond said wall into the fluid on said one side thereof;*

*(d) a plurality of electrodes disposed in a fluid-tight manner in said wall, the electrodes passing through said wall and placed in contact with the fluid on said one side of said wall, and in the alternating magnetic field;*

*(e) a sensing coil disposed in the alternating magnetic field, the sensing coil providing a sensing signal responsive to the alternating magnetic field;*

*(f) a circuit means including an amplifier to combine the sensing signal and the alternating signal corresponding to the change in potential caused by the movement of the fluid along said wall to yield a signal value corresponding to the rate of movement between said wall and said fluid; and*

*(g) means responsive to signal value.*

*22. A method of determining the speed of an electrically conductive fluid which method comprises:*

*(a) positioning one end of a permanent magnet having at least one set of alternating north and south poles at the one end thereof in a close spatial relationship with the fluid, the speed of which is to be determined;*

*(b) rotating the permanent magnet about an axis to provide an alternating magnetic field which extends into the fluid, the axis of the magnet being positioned substantially perpendicular to the direction of motion of the fluid;*

*(c) determining a sensing signal due to the alternating magnetic field when no relative motion occurs between the axis and the fluid;*

*(d) measuring an alternating signal due to the change in potential of the alternating magnetic field on move-*

*ment of the fluid in a direction substantially perpendicular to the axis; and*

(*e*) *combining the sensing signal and the alternating signal to provide a signal value corresponding to the speed of the fluid.*

References Cited

The following references, cited by the Examiner, are of record in the patented file of this patent or the orignal patent.

UNITED STATES PATENTS

| | | | |
|---|---|---|---|
| 3,119,960 | 1/1964 | Kenyon | 73—181 |
| 3,503,258 | 3/1970 | Baker | 73—181 X |
| 3,377,855 | 4/1968 | Coia et al. | 73—194 EM |

| | | | |
|---|---|---|---|
| 3,575,051 | 4/1971 | Moore | 73—194 EM |
| 3,002,383 | 10/1961 | Mittelmann | 73—194 EM |
| 3,094,870 | 6/1963 | Mittelmann | 73—194 EM |
| 3,339,410 | 9/1967 | Stery | 73—194 EM |
| 3,433,066 | 3/1969 | Bailey | 73—194 EM |
| 3,380,301 | 4/1968 | Mannherz et al. | 73—194 EM |

FOREIGN PATENTS

| | | | |
|---|---|---|---|
| 834,011 | 5/1960 | Great Britain | 73—194 EM |

CHARLES A. RUEHL, Primary Examiner

U.S. Cl. X.R.

73—194 EM

Disclaimer and Dedication

Reissue No. 28,327.—*John R. Lewis*, Framingham, Mass. FARADAY EFFECT SPEEDOMETER. Patent dated Feb. 4, 1975. Disclaimer and dedication filed Dec. 31, 1975, by the assignee, *Safe Flight Instrument Corporation.*

Hereby disclaims and dedicates to the Public the remaining term of said patent.

[*Official Gazette March 30, 1976.*]